United States Patent [19]

Niwa et al.

[11] Patent Number: 5,525,558

[45] Date of Patent: Jun. 11, 1996

[54] PROCESS FOR PRODUCING CARBON FIBER REINFORCED CARBON COMPOSITE MATERIAL, CARBON FIBER REINFORCED CARBON COMPOSITE MATERIAL AND SLIDING MATERIAL

[75] Inventors: Kazuo Niwa; Toshihiro Fukagawa; Nobuyuki Oonishi; Takeo Matsui; Yutaka Kawamata; Hitoshi Seki, all of Sakaide, Japan

[73] Assignee: Mitsubishi Chemical Corporation, Japan

[21] Appl. No.: 196,140

[22] PCT Filed: Jun. 16, 1993

[86] PCT No.: PCT/JP93/00812

§ 371 Date: Mar. 17, 1994

§ 102(e) Date: Mar. 17, 1994

[87] PCT Pub. No.: WO93/25493

PCT Pub. Date: Dec. 22, 1993

[30] Foreign Application Priority Data

| Jun. 16, 1992 | [JP] | Japan | 4-156999 |
| Jun. 16, 1992 | [JP] | Japan | 4-157000 |
| Jun. 17, 1992 | [JP] | Japan | 4-158284 |
| Jun. 17, 1992 | [JP] | Japan | 4-158285 |
| Oct. 2, 1992 | [JP] | Japan | 4-265186 |

[51] Int. Cl.$^6$ ................................................ C04B 35/52
[52] U.S. Cl. ........................ 501/99; 501/95; 264/60; 264/136; 264/DIG. 19; 428/364; 428/368; 428/408; 428/688
[58] Field of Search ........................ 501/95, 99; 264/60, 264/136, DIG. 19; 428/364, 368, 408, 688

[56] References Cited

U.S. PATENT DOCUMENTS

| 4,339,021 | 7/1982 | Kosuda et al. | 428/368 |
| 5,202,293 | 4/1993 | Okamoto et al. | 501/95 |
| 5,205,888 | 9/1993 | Mochida et al. | 264/136 |
| 5,243,746 | 9/1993 | Shinichi | 29/173 |

FOREIGN PATENT DOCUMENTS

| 54-41295 | 4/1979 | Japan . |
| 57-129814 | 12/1982 | Japan . |
| 58-30537 | 2/1983 | Japan . |
| 60-54270 | 11/1985 | Japan . |
| 62-96364 | 5/1987 | Japan . |
| 62-119288 | 5/1987 | Japan . |
| 62-266239 | 11/1987 | Japan . |
| 63-60155 | 3/1988 | Japan . |
| 1-176273 | 7/1989 | Japan . |
| 3-140211 | 6/1991 | Japan . |
| 3-193664 | 8/1991 | Japan . |
| 3-78498 | 12/1991 | Japan . |

OTHER PUBLICATIONS

Derwent WPI EP O 459 916 A1 WPI Acc No: 91-356144/49 Multilayer friction element etc. Bommier et al. Jun. 1991.
Database WPI Section Ch, Week 8727, Derwent, Class L02, AN 87-189308, JP-A-62 119 288 May 30, 1987.
Database WPI Section CH, Week 8841, Derwent Class A81, AN 88-288680 & JP-A-63 210 065 Toray Aug. 31, 1988.

*Primary Examiner*—Karl Group
*Assistant Examiner*—Michael Marcheschi
*Attorney, Agent, or Firm*—Nixon & Vanderhye

[57] ABSTRACT

A process for producing a carbon fiber reinforced carbon composite material, comprising dispersing a short fibrous bundle of carbon fibers which comprises a plurality of single fibers, preparing a sheet in which fibers are in the two-dimensional random orientation, impregnating with a resin or pitch, laminating and molding, and then applying a baking and densifying treatment, a dispersion degree of the bundle of carbon fibers being controlled based on the formula (1) expressing correlation between the dispersion degree of the bundle of carbon fibers and the mechanical strength of the carbon fiber reinforced composite material:

$$\text{Dispersion degree} = A - B \times \text{coefficient of friction} \quad (1)$$

wherein A and B are constants determined experimentally, to produce a carbon fiber reinforced carbon composite material having desired mechanical characteristic.

13 Claims, No Drawings

PROCESS FOR PRODUCING CARBON FIBER REINFORCED CARBON COMPOSITE MATERIAL, CARBON FIBER REINFORCED CARBON COMPOSITE MATERIAL AND SLIDING MATERIAL

CROSS REFERENCE TO RELATED APPLICATION

This application is a 371 of international application number PCT/JP 93/00812, filed Jun. 16, 1993.

TECHNICAL FIELD

The present invention relates to a process for producing a carbon fiber reinforced carbon composite material (hereinafter referred to as "a C/C composite material"), and a C/C composite material, and a sliding material. According to the producing process of the present invention, frictional characteristic and mechanical characteristic of the C/C composite material can be easily controlled. The C/C composite material of the present invention is excellent, for example, in friction characteristic and mechanical characteristic and it is suitable to a sliding material.

BACKGROUND ART

Generally, C/C composite materials are produced by impregnating or mixing long or short carbon fibers such as polyacrylonitrile (PAN) type, pitch type and rayon type with a thermosetting resin such as a phenol resin and a furan resin or a thermoplastic resin such as pitches, followed by heating and then baking them in a non-oxidative atmosphere at a temperature of from 600° to 2500° C.

Various kinds of methods, however, have been known for producing C/C composite materials in which short fibers are used. For instance, a method comprising mixing a solvent and carbon fibers in a mixer, forming into a mat by a screen and then applying a pressure to produce a porous carbon electrode (Japanese Patent Application Laid-Open (KOKAI) Nos. 54-41295(1979) and 57-129814(1982)); a method comprising mixing a solvent and carbon fibers of different length in a molding by ultrasonic vibrations (Japanese Patent Application Laid-Open (KOKAI) No. 58-30537(1983)); a method comprising laminating short fibers into a mat and then impregnating with a resin or pitch and molding (Japanese Patent Application Laid-Open (KOKAI) No. 62-119288(1987)); a method comprising applying heating in a solvent, thereby homogeneously dispersing short fibrous carbon fibers, and then removing the solvent to obtain a carbon fiber mass oriented at random (Japanese Patent Application Laid-Open (KOKAI) No. 62-96364(1987)); and a method comprising supplying a mixture of short fibers and a solvent to a molding having a plurality of solvent drawing ports at the bottom and then drawing out the solvent to form a pre-form (Japanese Patent Application Laid-Open (KOKAI) No. 1-176173(1989)) may be mentioned.

The C/C composite materials produced by the methods described above have been used in recent years as sliding materials of brakes for use in aircrafts or cars or clutches for use in cars, instead of existent metal disc rotors. This is because the C/C composite material is excellent, as compared with the metal disc rotor, in characteristics such as reduced weight and heat resistance.

For using the C/C composite material as the sliding material, it is necessary to control the frictional characteristic or the mechanical strength thereof to appropriate values.

As a method for controlling the frictional characteristic of the C/C composite material, the following methods are known for instance. Namely, a method for controlling the frictional characteristic of the C/C composite material by impregnating with coal tar, pitch, furan resin or the like (Japanese Patent Publication (KOKOKU) No. 60-54270(1985)), a method comprising orienting relatively long fibers (4 to 6 cm) and short fibers (0.015 to 0.3 cm) at random (Japanese Patent Publication (KOKOKU) No. 1-59459(1989)) and a method comprising cutting a carbon fiber reinforced thermosetting resin composite material in which carbon fibers are oriented so as to transverse a plane perpendicular to an axis of a cylinder along a direction in perpendicular to the axis of the cylinder, baking and densifying it to orient the carbon fibers such that they have a certain angle relative to a sliding surface (Japanese Patent Publication (KOKOKU) No. 3-78498(1991)) may be mentioned.

As a method for controlling the mechanical strength of the C/C composite material, the following methods have been known for instance. That is, a method comprising using short fiber reinforced type C/C composite material of excellent coefficient of friction only to the sliding portion at the surface and using a two-dimensional fabric (so-called woven fabric) to the core portion as a reinforcing material for compensating the mechanical strength of the short fiber reinforced type C/C composite material (Japanese Patent Application Laid-Open (KOKAI) No. 2-266239(1987)), and a method comprising forming a sliding layer at the surface as a "fine" texture comprising segments in which short fibrous carbon fibers are distributed at random and having a mean pore size of less than 50 μm, while forming a structural layer at the inside as a "coarse" texture comprising a mesh of short fibrous carbon fibers and having a mean pore size of more than 100 μm (EP 0459916 A1) may be mentioned.

Further, for a practical use as a sliding material, it is necessary for wear resistance under high load condition such as high energy level and high pressure. For this purpose, it has been conducted to increase density (reduction of porosity) and increase strength by repeating a densifying treatment. As such a method, it has been known, for example, a method of impregnating with a thermosetting resin such as a phenol resin or a furan resin or a thermoplastic resin such as pitches, or a CVD process in which a gaseous organic material such as methane, propane and dichloroethylene, is used as a raw material.

However, in the above-mentioned proposals, there have been still present a lot of problems to be solved regarding not only the producing method of the C/C composite material but also for the use as the sliding material.

For instance, the producing method of the C/C composite material involves the following problems. In the method as described in Japanese Patent Application Laid-Open (KOKAI) No. 62-119288(1987), since mats formed from short fibers (non-woven fabrics) are laminated and the laminate is impregnated with a resin or pitch, no sufficient resin or pitch is impregnated into each of non-woven fabrics, making it difficult to mold a C/C composite material of large thickness. In addition, large voids are liable to be formed between each of carbon fibers or between each of laminated carbon fiber layers, and accordingly this tends to result in a C/C composite material of poor strength. Further, the method as described in each of the Japanese Patent Application Laid-Open (KOKAI) Nos. 62-96364(1987) and 1-176273(1989) involves a drawback of tending to cause an uneven distribution of carbon fibers upon preparing a thick pre-form. Further, since fibers are oriented in a pseudo three dimensional manner in other methods, it tends to result in uneven distribution of carbon fibers, local voids, and non-uniformity in view of the strength, so that there is a problem of failing to obtain a uniform characteristic upon using as a frictional material or sliding material.

In order to overcome the foregoing problems, the present inventors have previously proposed a method comprising dispersing short fibrous carbon fibers and preparing a sheet in a two-dimensional random orientation in Japanese Patent Application Laid-Open (KOKAI) No. 3- 140211(1991), but still it can not be said satisfactory in view of weight reduction and strength of the C/C composite material.

Further, in particular, with respect to the impregnating treatment in the method for producing the C/C composite material, there are the following problems. Namely, in the case of using a thermosetting resin such as a phenol resin or furan resin, since pores are liable to be closed to leave pores at the inside during repeating of impregnation, curing and baking steps, it is difficult to reduce the porosity. Further, in the case of a CVD process using a gaseous organic material such as methane, propane and dichloroethylene as a raw material, adhesion with carbon fibers is poor, resulting in remarkable consumption by abrasion upon application to a brake sliding portion.

In the case of using a thermoplastic resin such as pitches, those having high softening point are generally used in order to obtain high carbonization yield. However, since a pitch having high softening point is poor in impregnating characteristic and requires high temperature treatment, excessively large facility is required for producing C/C composite materials and handling becomes troublesome. That is, each of the above-mentioned methods has respective merits and demerits and is not satisfactory.

Regarding the control for the characteristic as the sliding material, there are the following problems.

The method described in Japanese Patent Publication (KOKOKU) No. 60-51270(1985) notes just a matrix and does not mention essential orientation of carbon fibers. The method described in Japanese Patent Publication (KOKOKU) No. 1- 59459(1989) needs the mixing of two different kinds of carbon fibers and any particular effect of carbon fiber length is not shown. Further, the method as described in Japanese Patent Publication (KOKOKU) No. 3-78498(1991) involves a problem that a disc in which carbon fibers are oriented so as to transverse a plane in perpendicular to the axis of a cylinder, has to be cut crosswise for production, and therefore producing steps are complicate.

Further, the above-mentioned proposal shows no concrete descriptions regarding control for the frictional characteristic, and merely shows general tendency. On the other hand, the proposal in Japanese Patent Application Laid-Open (KOKAI) No. 62-266239(1987) regarding control for the mechanical strength is expensive because woven fabrics are used as the structural material for the central portion, and it only suggests reinforcement without considering a balance of the strength. Further, the proposal of EP 0459916 A1 refers only to the abrasion amount and reinforcement for the strength.

As described above, the proposals made so far mentions nothing about the control of the frictional characteristic and the balance of the strength.

The present inventors have made various studies for overcoming the foregoing problems and obtained the following findings.

(1) In the case of dispersing a short fibrous bundle of carbon fibers to prepare a sheet in which fibers are in a two-dimensional random orientation, the frictional characteristic and the mechanical characteristic of the C/C composite material change depending on the degree of dispersion for the bundle of carbon fibers. For instance, the coefficient of friction becomes low as the dispersion degree of the bundle of carbon fibers becomes high, and it becomes high as the dispersion degree becomes low. The compression strength becomes high as the dispersion degree of the bundle of carbon fibers becomes high. The tensile strength, bending strength and impact strength become high as the dispersion degree of the bundle of carbon fibers becomes low.

(2) Contrary to the common knowledge in the prior art, a C/C composite material produced from carbon fibers which are sizing-free has remarkably high wear resistance.

(3) A C/C composite material having a final porosity of not more than 20% by volume, preferably not more than 10% by volume obtained by a particular method is firm in adhesion of carbon fibers and a matrix to cause less fracture at micro level, and exhibits excellent wear resistance.

DISCLOSURE OF THE INVENTION

The present invention has been accomplished based on the above-mentioned findings and the object thereof is to provide a process for producing a C/C composite material capable of controlling frictional characteristic and mechanical characteristic which is more convenient and simpler than the existent method and extend the application use of the C/C composite material as a sliding material.

Another object of the present invention is to provide a C/C composite material excellent in mechanical strength and wear resistance as compared with existent C/C composite materials, as well as a sliding material comprising the same. The foregoing objects can be attained by the present invention:

(1) A process for producing a carbon fiber reinforced carbon composite material, comprising dispersing a short fibrous bundle of carbon fibers composed of a plurality of single fibers, preparing a sheet in which fibers are in the two-dimensional random orientation, impregnating with a resin or pitch, laminating and molding, and then applying a baking and densifying treatment, a dispersion degree of the bundle of carbon fibers being controlled based on the formula (1) expressing correlation between the dispersion degree of the bundle of carbon fibers and the mechanical strength of the carbon fiber reinforced composite material:

$$\text{Dispersion degree} = A - B \times \text{coefficient of friction} \quad (1)$$

wherein A and B are constants determined experimentally, to produce a carbon fiber reinforced carbon composite material having desired mechanical characteristic.

(2) A carbon fiber reinforced carbon composite material formed by laminating and molding sheets in which carbon fibers are in a two-dimensional random orientation, wherein a dispersion degree of a bundle of carbon fibers is different by not less than 0.05 between the inner layer portion thereof and the surface layer portion thereof, the dispersion degree being evaluated based on the formula (2) or (3):

$$\text{Dispersion index } (X) = t/W \quad (2)$$

wherein t represents an entire sheet thickness (mm) and W represents an entire sheet weight (g), $$\text{Dispersion index } (Y)=100-T \quad (3)$$

wherein T represents light transmittance (%).

(3) A process for producing a carbon fiber reinforced carbon composite material, comprising dispersing a short fibrous bundle of carbon fibers comprising a plurality of single fibers which are sizing-free, impregnating with a resin or pitch to form a pre-preg, laminating and molding the pre-preg, baking at a temperature of not more than 2000° C. and then repeating pitch-impregnating step and baking step at a temperature of not more than 2000° C. to produce a carbon fiber reinforced composite material having a final porosity of not more than 10% by volume.

(4) A sliding material comprising the carbon fiber reinforced composite material as described above.

Description will now be made more in details to the present invention.

In the present invention, a short fibrous bundle of carbon fibers comprising a plurality of single fibers is used. The short fibrous bundle of carbon fibers is usually obtained by a cutting tow, strand, roving, yarn or the like comprising a bundle of 2000 to 8000 single fibers. The length for the short fibrous bundle of carbon fibers is usually about 0.3 to 100 mm, preferably about 5 to 50 mm. Further, there is no particular restriction on the kind of the carbon fibers and any of carbon fibers such as pitch type, PAN type, or rayon type fibers may be used.

In the present invention, a bundle of carbon fibers which are sizing-free is preferably used. If sizing is deposited on the bundle of carbon fibers, dispersion of the bundle of carbon fibers tends to be difficult. Therefore, it is preferred in the case of reducing the dispersion degree but not preferred in the case of increasing the dispersion degree. The sizing deposited to the bundle of carbon fibers can be removed by heat treatment or chemical method.

In the present invention, the bundle of carbon fibers is at first dispersed to prepare a sheet in which fibers are in a two-dimensional random orientation. For instance, the bundle of carbon fibers is dispersed and scattered to prepare a sheet by the method as described in each of Japanese Patent Application Laid-Open (KOKAI) Nos. 62-96364(1987) and 1-176273(1989). In the present invention, it is important that the short carbon fibers are in a two-dimensional random orientation in the finally obtained sheet. The two-dimensional random orientation means that all of the short fibers are substantially oriented within the plane of the sheet.

There is no particular restriction on the method of dispersion and, for example, in the case of using a beating treatment, a method comprising using a beater usually employed for pulp beating can be adopted. That is, a mixture of a solvent and a bundle of carbon fibers is supplied to a beater comprising a bath having a partition, a rotating roll having blades and fixed counter blades, and it is passed between the rotating roll and the counter blades. As a result, a vortex stream is caused between adjacent blades of the rotating roll, by which the bundle of carbon fibers is dispersed into single fibers. In this case, it is preferred to make a gap between the rotating roll and the counter blade not less than 100 μm and to cover top ends of the rotating roll blades and the counter blades with a rubber material in order that the carbon fibers may not injured.

The circumferential speed of the rotating roll is preferably not more than 600 m/min in order to attain a smooth rotation. While a residence time is different depending on the throughput and the size of the device, it is necessary that the mixture of the solvent and the bundle of carbon fibers has to pass between the rotating roll and the counter blade by at least once. Preferably, the thickness of the blade attached to the rotating roll is about from 1 to 15 mm, while the number of blades is about from 60 to 114. The counter blade is not always necessary in a gear-like form. In the case of a gear-like counter blade, it is preferred that the thickness of the counter blade is about from 3 to 12 mm and the number of the blades is about from 15 to 20.

In the dispersing method by using the beater, the dispersion degree can be increased either by increasing the circumferential speed of the rotating roll or making the residence time longer.

Further, in the present invention, it can be adopted a method comprising dispersing a bundle of carbon fibers scattered in a solvent in a wet process by a pulper used for the fibrillating treatment of pulp or the like, besides the beater as described above, and then subsequently paper-making and drying. That is, the sheet can be prepared by dispersing the short fibrous carbon fibers in a solvent, then, supplying them little by little, for example, to a frame having a screen at the bottom, or homogeneously dispersing them with agitation or like other means after dispersion, paper-making on a metal net, followed by drying.

Furthermore, in the present invention, a method comprising using a random webber generally employed in the production of non-woven fabrics and passing a bundle of carbon fibers into a plurality of opposing cylinders each having an array of needles to disperse in a dry process can be adopted. In this case, the dispersion degree can be increased by increasing the rotational speed of the cylinder.

There is no particular restriction on the solvent for homogeneously scattering the bundle of carbon fibers, and water, acetone, $C_{1-5}$ alcohol, anthracene oil or the like is preferred. Other organic solvents may also be used. If phenol resin, furan resin, pitch or the like is dispersed or dissolved in the solvent, carbon fibers are adhered to each other to facilitate the handling in the succeeding step, and therefore it is preferred. Further, addition of a thickening agent such as sodium cellulose glycolate, polyvinyl alcohol and hydroxy cellulose into the solvent is preferred because the foregoing effect is further improved. In this case, the dispersion degree can be increased by making the processing time longer.

What is most important in the present invention is to previously determine a correlation between the dispersion degree of the bundle of carbon fibers and various mechanical strength in order to obtain desired mechanical characteristics.

Description will be made to an example of the coefficient of friction.

Usually, correlation between the dispersion degree and the coefficient of friction can be expressed by a linear equation. Specifically, it can be expressed by the following formula (1).

$$\text{Dispersion degree}=A-B\times\text{coefficient of friction} \quad (1)$$

wherein A and B are constants determined experimentally.

At first, the constants A and B are determined by the following method. The values for the constants A and B vary depending on the evaluation method for the dispersion degree and also by types of raw materials used such as carbon fibers and resins, as well as producing conditions other than the dispersion degree. Accordingly, for determining the constants A and B, it is necessary to fix factors other than the dispersion degree at constant and to vary only the dispersion degrees at least two levels, preferably three or more levels, whereby different kinds of C/C composite materials are previously manufactured, coefficients of friction thereof are measured and a correlationship between the dispersion degree and the coefficient of friction is examined.

Next, after determining the desired dispersion degree, the dispersion degree of the carbon fiber sheet is evaluated to judge if a sheet of a desired dispersion has been prepared or not. The result can be reflected directly on the producing conditions, by which the accuracy for the dispersion degree can be improved further. Accordingly, it is important that the evaluation method of the dispersion degree is convenient and rapid.

There is no particular restriction on the evaluation method of the dispersion degree, and it can be adopted, for example, a method based on the observation that bulkiness of the sheet is increased as the dispersion degree is increased. That is, sheets of predetermined area, predetermined number and weight W (g) are laminated, and the entire thickness t (mm) of the sheets when they are put under a constant load is measured, to determine a dispersion index X defined by the following formula (2):

$$\text{Dispersion index } (X) = t/W \quad (2)$$

In the method described above, since the thickness t of the sheet is increased as the dispersion degree is increased, the dispersion index X is also increased as the dispersion degree is increased. In the case of this method, evaluation can be conducted also after impregnating the sheet with the resin or the like. However, since the value for the dispersion index X varies depending on the types of the carbon fibers and the resin or the ratio between them, it is necessary to always evaluate under identical conditions.

As another example for the evaluation of the dispersion degree, it can be adopted a method based on the observation that a gap between the fibers is reduced as the dispersion degree is increased. That is, a method of measuring light transmittance T (%) by using a sheet of a constant weight and a constant area and determining the dispersion index Y defined by the formula (3):

$$\text{Dispersion index } (Y) = 100 - T \quad (3)$$

In the method described above, since the transmittance T is lowered as the dispersion degree is increased, the dispersion index Y is increased as the dispersion degree is increased. In this method, evaluation can be conducted also after impregnating the sheet with a resin or the like. However, since light can not transmit the sheet irrespective of the dispersion degree if the METSUKE (weight per unit area) thereof is excessively large, there is a limit on the METSUKE of a sheet that can be evaluated. The METSUKE (weight per 1 $m^2$) of the sheet is optimally 10 to 500 $g/m^2$ in view of handleability, impregnation characteristic and homogeneity.

When the two methods are compared, the former method is more preferred since evaluation can be conducted in a state of pre-preg, handling of which is easier.

In the present invention, a sheet of a desired dispersion degree obtained as described above is impregnated with a matrix such as phenol resin, furan resin or petroleum or coal type pitch followed by drying. In this case, the matrix used is adjusted to an appropriate viscosity by dissolving it into a solvent such as alcohol, acetone or anthracene oil.

Then, in a preferred embodiment of the present invention, the thus dried sheets are designed to laminate so that desired coefficient of friction and mechanical characteristic can be obtained.

For instance, in the case of lowering the coefficient of friction and increasing the impact strength, the following procedures are taken.

At first, the dispersion degree is determined in accordance with a correlation formula so as to obtain a desired coefficient of friction for the sliding portion at the surface. In this case, the dispersion degree is determined to a relatively high level for obtaining a low coefficient of friction. For instance, in the case of determining the dispersion index X defined by the formula (2) by stacking 20 impregnated sheets each having a unit area weight of 200 $g/m^2$ and a phenol resin content of 120 $g/m^2$ cut into 95×95 mm, and dividing the thickness t (mm) of the sheets under a load of 2.2 kg, by the weight of 20 sheets W (g), a value of about 0.9 to 1.2 is preferred.

Then, considering each thickness shared by the surface portion as the sliding portion and the inner layer portion, the dispersion degree of the inner layer is determined in accordance with the correlation formula so as to obtain a required impact strength. In this case, the dispersion degree of the inner layer is determined to a relatively low level for obtaining a high impact strength. For instance, a value of the dispersion index X determined by the above-mentioned method is preferably about from 0.5 to 0.85.

For instance, when the friction characteristic is increased and the compression strength is increased, the following procedures are taken.

At first, the dispersion degree is determined in accordance with the correlation formula so as to attain a desired coefficient of friction for the sliding portion at the surface. In this case, the dispersion degree is determined to a relatively low level in order to obtain a high coefficient of friction. For instance, a value of the dispersion index X determined by the above-mentioned method is preferably about from 0.5 to 0.85.

Then, considering each thickness shared by the sliding portion of the surface layer and the inner layer, the dispersion degree of the inner layer is determined in accordance with the correlation formula so as to obtain the required compression strength. In this case, the dispersion degree of the inner layer is determined to a relatively high level in order to obtain the high compression strength. For instance, a value of the dispersion index X determined by the above-mentioned method is preferably about from 0.9 to 1.2.

In the present invention, the sheets designed as described above are laminated, charged in a die and press-molded at a temperature of 100° to 500° C. to obtain a molded product having $V_f$ (fiber content) of about 5 to 65% (by volume), preferably about 10 to 55% (by volume). Subsequently, they are baked in atmosphere of an inert gas such as $N_2$ gas by heating at a temperature elevation rate of 1° to 200° C./h up to 800° to 2500° C. to obtain a C/C composite material.

The baked C/C composite material can be further improved in the strength by applying a densifying treatment to three types of matrixes solely or in combination in accordance with the following methods (1) and (2).

(1) Densifying Treatment by Resin or Pitch

The C/C composite material is placed in a vessel heated to a predetermined temperature and, after evacuating the inside of the vessel, a resin or molten pitch is supplied to impregnate voids caused by baking, with the matrix. Subsequently, it is baked again at a temperature of 800° to 2500° C. By repeating such steps, the C/C composite material is densified. It is preferred to use a pitch having a softening point of 70° to 120° C., preferably 80° to 90° C., a toluene insoluble content of 10 to 30% (by weight), preferably 13 to 20% (by weight), a quinoline insoluble content of not more than 1% (by weight) and a fixed carbon content of not less than 40% (by weight), preferably not less than 50% (by weight).

As described above, in the case of applying the densifying treatment by impregnation with the resin or pitch, the baking temperature of not more than 2000° C. is preferable. If the baking temperature exceeds 2000° C., adhesion between the fibers and the matrix tends to be reduced due to radial shrinkage of the fibers, development of crystallinity at the surface of the fibers or the like. On the other hand, if the baking temperature is too low, oxidation resistance tends to be deteriorated. The baking temperature is preferably from 1600° to 2000° C. Further, since baked molded product has a number of voids and it is difficult to put the product to practical use as it is. Then, in order to reduce such voids, the densifying treatment is preferably repeated for a number of times. Further, in order to improve the wear resistance, the densifying treatment is preferably repeated such that final porosity is reduced to not more than 20% by volume, preferably not more than 10% by volume. The porosity can be measured in accordance with a conventional method by using a mercury porosimeter.

(2) Densifying Treatment by CVD

The C/C composite material placed in a reactor is heated by induction heating coils or the like, vapor of hydrocarbon or halogenated hydrocarbon is supplied together with a carrier gas such as Ar or $N_2$ gas into the reactor and the carbon resulted by pyrolysis is filled in the voids to attain densification. Further, a graphitizing treatment is applied if necessary to finally produce a C/C composite material having desired coefficient of friction and mechanical characteristic.

The producing method according to the present invention provides a C/C composite material molded by laminating sheets in which carbon fibers are in a 2-dimensional random orientation, having the porosity of not more than 20% by volume, preferably not more than 10% by volume and having different dispersion degree of the bundle of carbon fibers between the inner layer portion and the surface layer portion. The C/C composite material described above is produced in accordance with the producing method described above, by dispersing a short fibrous bundle of carbon fibers comprising a plurality of single fibers, thereby preparing a sheet in which fibers are in a two-dimensional random orientation, impregnating with a resin or pitch, laminating and molding and then applying a baking and densifying treatment.

Then, in the C/C composite material described above, the surface layer portion means a surface on the side serving as the sliding surface and both surfaces of the C/C composite material may constitute the surface layer portion. There is no particular restriction on the thickness of the surface layer portion and it is usually within a range from 0.1 to 20 mm, preferably 0.5 to 10 mm. Further, the dispersion degrees of the bundle of carbon fibers in the inner layer portion and the surface layer portion are selected as described previously, and the difference between the dispersion degrees is preferably not less than 0.05.

The C/C composite material produced in accordance with the present invention is particularly suitable as a C/C sliding material excellent in durability.

BEST MODE FOR CARRYING OUT THE INVENTION

Descriptions will now be made to the present invention more specifically, referring to examples, but the present invention is not restricted to the following examples unless it goes beyond the scope thereof.

Example 1

At first, in order to produce a C/C composite material having a target coefficient of friction of 0.26 under the following producing conditions in which the correlation between the dispersion index X of the formula (2) representing the dispersion degree of the bundle of carbon fibers and the coefficient of friction is represented by the formula (1) wherein A=1.77 and B=4.33, the dispersion index X was calculated from the formula (4) to obtain a target dispersion index X of 0.64.

Target dispersion index (4)
$X = 1.77 - 4.33 \times$ target coefficient of friction Then, a bundle of sizing-free pitch type carbon fibers cut into 30 mm length and having a number of filaments of 4000 is dispersed by a random webber to obtain a sheet having a dispersion degree of the bundle of carbon fibers of 0.64 expressed by the dispersion index X and a unit area weight (METSUKE) of 200 $g/m^2$, oriented at random two-dimensionally.

Then, the sheet was impregnated with a phenol resin diluted in ethanol and then dried to produce a sheet impregnated with a phenol resin in an amount of 110 $g/m^2$ per unit area. From the sheet in the state, 20 sheets of specimens each sized 95×95 mm were sampled and their weight W (g) was measured.

Then, the 20 sheets of specimen were laminated such that the ends are aligned and the thickness t (mm) for the 20 sheets of webs was measured under a load of 2.2 kg. Then, the dispersion index X defined by the formula (2) was calculated based on W and t to confirm that a sheet having a dispersion index X of 0.64 as desired was obtained.

Then, the sheets were laminated in a die and press molded at 250° C. to obtain a molded product having $V_f$ of about 50%. After baking the molded product at 2000° C. in a heating furnace, it was heated to 550° C. by a high frequency heating device, dichloroethylene vapor was introduced with nitrogen gas as a carrier gas into the reactor and a densifying treatment of filling voids with pyrolyzate carbon was conducted.

Then, after impregnating with the pitch, the product was baked in a heating furnace at 1000° C. Further, the same impregnation-sintering procedures were repeated again. Subsequently, a treatment at 2000° C. was applied to obtain a C/C composite material according to the present invention. Using the C/C composite material, an inertia friction test was repeated for 100 cycles under the conditions at a number of rotation of 5000 rpm and a surface pressure of 12 $kg/cm^2$ to measure coefficient of friction. The coefficient of friction of the C/C composite material is shown in Table 1.

Example 2

For producing a C/C composite material having a target coefficient of friction of 0.22, a target dispersion index of 0.82 was obtained from the formula (4). Then, in accordance with the same method as in Example 1, a C/C composite material was obtained. The coefficient of friction of the C/C composite material is shown in Table 1.

Example 3

For producing a C/C composite material having a target coefficient of friction of 0.165, a target dispersion index of 1.06 was obtained from the formula (4). Then, in accordance with the same method as in Example 1, a C/C composite material was obtained. The coefficient of friction of the C/C composite material is shown in Table 1.

TABLE 1

|  | Example 1 | Example 2 | Example 3 |
|---|---|---|---|
| Target dispersion index | 0.64 | 0.82 | 1.06 |
| Coefficient of friction |  |  |  |
| Target value | 0.26 | 0.22 | 0.17 |
| Measured value | 0.25 | 0.23 | 0.16 |
| Compression strength (kg/mm$^2$) | 9 | 10 | 11 |
| Tensile strength (kg/mm$^2$) | 11 | 9 | 7 |
| Bending strength (kg/mm$^2$) | 16 | 14 | 13 |
| Impact strength (kg·cm/cm) | 6 | 3 | 2 |

Example 4

In producing a specimen having 10 mm in thickness, the thickness for each of the sliding portions at the surface layer was made 2.5 mm and the thickness of the inner layer of the reinforcing portion against the impact or the like was made 5 mm. The characteristic of the sample was designed as below.

Coefficient of friction=0.16

Impact strength=4 (kg·cm/cm)

Then, under the following producing conditions in which the correlation between the dispersion index X in the formula (2) expressing the dispersion degree of the bundle of carbon fibers and the coefficient of friction is represented by the formula (1) wherein A=1.81 and B=4.67, and the correlation between the dispersion index X and the impact strength is represented by the formula (1) wherein A=1.35 and B=0.127, the dispersion index X for producing the C/C composite material having the coefficient of friction for the sliding portion of 0.16 was at first calculated from the formula (5), to obtain a target dispersion index of 1.06.

Target dispersion index (X)=1.81−4.67×target coefficient of friction (5)

Then, the impact strength when produced at a target dispersion index of 1.06 was determined from on the formula (6), to obtain an expected impact strength of 2.3.

Target dispersion index (X)=1.35−0.127×target impact strength (6)

Then, the necessary impact strength (Z) for the inner layer is determined from the formula (7) in order that the impact strength of the specimen is 4 (kg·cm/cm), resulting Z=5.7.

Impact strength of the specimen: 4=2.3×(2.5×2/10)+Z×5/10 (7)

Accordingly, it is calculated according to the formula (5) to obtain a target dispersion index (X) of 0.63 so that the impact strength of the inner layer being 5.7 (kg·cm/cm).

Then, a bundle of sizing-free pitch type carbon fibers cut into 30 mm in length, having a number of filaments of 4000 was dispersed by a random webber to produce sheets in which fibers were in the two-dimensional random orientation with the unit area weight (METSUKE) of 200 g/m$^2$ at the dispersion degree of the bundle of carbon fibers of 0.63 and 1.06 expressed by the dispersion index, respectively.

Then, after impregnating the above-mentioned sheet with a phenol resin diluted in ethanol, it was dried to produce a sheet impregnated with 110 g/m$^2$ of phenol resin. Twenty sheets of specimens each sized 95×95 mm were sampled from the sheet in this state to measure the weight W (g) thereof.

Then, the 20 sheets of the specimens were laminated such that the ends were aligned and the thickness L (mm) for 20 sheets of webs under a weight of 2.2 kg was measured. Based on W and t, the dispersion index X defined by the formula (2) was calculated to confirm that the sheet having a dispersion index X of 0.63 or 1.06 was obtained as desired.

Then, sheets having the dispersion index of 1.06 for the sliding portion were laminated in such amount as providing a thickness of 2.5 mm in the final shape, over which sheets having the dispersion index of 0.63 for the sliding portion were laminated in such amount as providing a thickness of 5 mm in the final shape. Thereover sheets having the dispersion index of 1.06 for the sliding portion were further laminated in such amount as providing a thickness of 2.5 mm in the final shape.

The thus laminated sheets were charged in a die and press-molded at 250° C. to obtain a molded product having $V_f$ of about 50%. After baking the molded product in a heating furnace in an inert atmosphere to 2000° C., the product was heated by a high frequency heating device to 550° C., dichloroethylene vapor was introduced with nitrogen gas as a carrier gas into a reactor and a densifying treatment for filling voids with pyrolyzate carbon was applied.

Then, after impregnating with a pitch, baking was conducted in a heating furnace in an inert atmosphere at 1000° C. Further, after repeating the same impregnation-baking procedures, a treatment at 2000° C. was applied to obtain a C/C composite material according to the present invention having a porosity of 12%. Using the C/C composite material, an inertia friction test was repeated for 1000 cycles under the conditions at a number of rotation of 5,000 rpm and a surface pressure of 12 kg/cm$^2$ to measure the coefficient of friction. Further, the impact strength of the C/C composite material was measured. The results are shown in Table 2.

Comparative Example 1

A C/C composite material was obtained in the same procedures as in Example 4 except for using only the sheets having a dispersion index X of 1.06 produced in Example 4. The results for the measurement of the coefficient of friction and impact strength of the C/C composite material are shown in Table 2.

Comparative Example 2

A C/C composite material was obtained in the same procedures as in Example 4 except for using only the sheets having a dispersion index X of 0.63 produced in Example 4. The results for the measurement of the friction characteristic and impact strength of the C/C composite material are shown in Table 2.

TABLE 2

|  | Example 1 | Comparative Example 1 | Comparative Example 2 |
|---|---|---|---|
| Target dispersion index (X) | 0.64 and 1.06 | 1.06 | 0.63 |
| Coefficient of friction |  |  |  |
| Target value | 0.16 | 0.16 | — |
| Measured value | 0.16 | 0.16 | — |

TABLE 2-continued

|  | Example 1 | Comparative Example 1 | Comparative Example 2 |
|---|---|---|---|
| Impact strength (kg · cm/cm) | | | |
| Target value | 4.0 | 2.3 | 5.7 |
| Measured value | 3.9 | 2.3 | 5.6 |

Example 5

A bundle of sizing-free pitch type carbon fibers cut into 30 mm length, and having a number of filaments of 4000 was dispersed by a random webber to obtain a sheet oriented at random two-dimensionally having unit area weight (MET-SUKE) of 200 g/m².

Then, the sheet was impregnated with a phenol resin diluted in ethanol, and then dried to prepare a sheet impregnated with 130 g/m² of the phenol resin per unit area. The sheets were laminated in a die and press-molded at 250° C. to obtain a molded product having $V_f$ of about 50%. After baking the molded product in a heating furnace at 2000° C., it was impregnated with a pitch and baked in a heating furnace at 1000° C. After repeating the procedures of impregnation and baking for four times, baking was applied at 2000° C., impregnation was applied once again and then sintering was applied at 2000° C. to obtain a C/C composite material according to the present invention having 8% porosity.

Using the C/C composite material, an inertia friction test was repeated for 20 cycles under the conditions at a number of rotation of 7000 rpm and a surface pressure of 12 kg/cm². Then, change of the thickness for the test specimen before and after the test was measured, based on which a wearing amount per one cycle of the test was calculated to define it as a wearing rate. The wearing rate of the C/C composite material is shown in Table 3.

Comparative Example 3

Except for using a bundle of pitch type carbon fibers cut into 30 mm length, having a number of filaments of 4000 and deposited by 1% polyvinyl alcohol sizing, a C/C composite material of 8% porosity was obtained in the same procedures as in Example 5 and the abrasion rate thereof was measured. The wearing rate of the C/C composite material is shown in Table 3.

Comparative Example 4

The material was molded in the same procedures as those in Example 5, baked at 2000° C. and then heated by a high frequency heating device to 550° C. Dichloroethylene vapor was introduced into a reactor with nitrogen gas as a carrier gas and then voids were filled with pyrolyzate carbon. Then, pitch was impregnated and baking was applied in a heating furnace at 1000° C. After repeating the procedures of impregnation and baking again, baking was applied at 2000° C. to obtain a C/C composite material of 12% porosity. Then the wearing rate was measured by the same procedures as in Example 1. The wearing rate of the C/C composite material is shown in Table 3.

Comparative Example 5

A C/C composite material of 8% porosity was obtained in accordance with the same procedures as in Example 5 except for increasing the baking temperature just after the molding to 2400° C., and the wearing rate was measured. The wearing rate of the C/C composite material is shown in Table 3.

TABLE 3

|  | Example 5 | Comparative Example 3 | Comparative Example 4 | Comparative Example 5 |
|---|---|---|---|---|
| Wearing rate (× 10⁻⁴ mm/stop/surface) | 1 | 19 | >50 | 50 |

Example 6

A bundle of pitch type carbon fibers at 30 mm in length having a number of filaments of 4000 was dispersed by a random webber to obtain a sheet having a unit area weight (METSUKE) of 200 g/m² in which fibers were in a two-dimensional random orientation. The sheet was impregnated with a phenol resin diluted in ethanol and then dried to obtain a sheet impregnated with 130 g/m² of the phenol resin based on 200 g/m² of the carbon fibers. The sheets were laminated in a die and press-molded at 250° C. to obtain a molded product having $V_f$ of about 50%. After baking the molded product in a heating furnace at 2000° C., it was applied with a heat treatment at 500° C. for 5 hours under a pressure of 6 kg/cm² in a state of being impregnated with a pitch having a softening point of 85° C., a toluene insoluble content of 15%, substantially negligible quinoline insoluble content and fixed carbon of 55% and then baked in a heating furnace at 1000° C. Further, after repeating the same procedures of impregnation-coking-baking for four times, a treatment was at 2000° C. applied to obtain a C/C composite material according to the present invention having 6% porosity. When the wearing rate was examined by using the C/C composite material under the conditions at a number of rotation of 7000 rpm and a surface pressure of 12 kg/cm², it was 0.5×10⁻⁴ mm/STOP·surface.

According to the present invention as described above, it is provided a method of producing a C/C composite material, in which the coefficient of friction and mechanical characteristic can be easily controlled and, particularly, the application use of the C/C composite material as the sliding material can be extended.

INDUSTRIAL APPLICABILITY

In the producing method according to the present invention, the frictional characteristic and the mechanical characteristic of the C/C composite material can be easily controlled and, further, the C/C composite material according to the present invention is excellent in the coefficient of friction, the mechanical characteristic or the like and it is suitable as the sliding material.

We claim:

1. A process for producing a carbon fiber reinforced carbon composite material, comprising the steps of:

(a) dispersing a short fibrous bundle of carbon fibers composed of a plurality of single fibers, (b) preparing a sheet in which fibers are in a two-dimensional random orientation, (c) impregnating the sheet with a resin or pitch, (d) laminating and molding the sheet, and then (e) baking and densifying the sheet to form the composite material, wherein the dispersion index of the bundle of carbon fibers is controlled based according to the formula:

$$\text{Dispersion index} = A - B \times \text{coefficient of friction} \quad (1)$$

wherein A and B are constants determined by the steps off (i) preparing a plurality of carbon fiber reinforced carbon composites by changing the dispersion conditions while maintaining factors other than the dispersion conditions constant, (ii) measuring the dispersion index and coefficient of friction of each of the carbon fiber reinforced carbon composites prepared in (i), the dispersion index being defined by formula (2) or (3):

$$\text{Dispersion index} = t/W \quad (2)$$

wherein t is the entire thickness of the impregnated sheets and W is the weight of the impregnated sheets when the impregnated sheets of an area and number are placed under a load, $$\text{Dispersion index} = 100 - T \quad (3)$$

wherein T is the transmittance of the impregnated sheets of a weight and an area, and thereafter (iii) determining constants A and B from the measured dispersion indexes and coefficients of friction based on formula (1), to produce the carbon fiber reinforced carbon composite material.

2. A process for producing a carbon fiber reinforced carbon composition material according to claim 1, wherein the short fibrous bundle of carbon fibers comprise a plurality of single fibers which are sizing-free.

3. A process for producing a carbon fiber reinforced carbon composition material according to claim 1, wherein the pitch used in step (c) has a softening point of 70° to 120° C., a toluene-insoluble content of 10 to 80%, a quinoline-insoluble content of not more than 1% and fixed carbon of not less than 40%.

4. A carbon fiber reinforced carbon composite material formed by laminating and molding sheets in which a short fibrous bundle of carbon fibers are in a two-dimensional random orientation, wherein a dispersion index of a bundle of carbon fibers is different by not less than 0.05 between an inner layer portion thereof and a surface layer portion thereof, the dispersion index being evaluated based on the formula (2) or (3):

$$\text{Dispersion index } (X) = t/W \quad (2)$$

wherein t represents an entire sheet thickness (mm) and W represents an entire sheet weight (g), $$\text{Dispersion index } (Y) = 100 - T \quad (3)$$

wherein T represents light transmittance (%).

5. A carbon fiber reinforced carbon composite material according to claim 4, produced by dispersing a short fibrous bundle of carbon fibers comprising a plurality of single fibers, preparing a sheet in which fibers are in a two-dimensional random orientation, impregnating with a resin or pitch, laminating and molding, and then applying a baking and densifying treatment.

6. A carbon fiber reinforced carbon composite material according to claim 4, wherein the short fibrous bundle of carbon fibers comprises a plurality of single fibers which are sizing-free.

7. A carbon fiber reinforced carbon composite material according to claim 5, wherein the pitch has a softening point of 70° to 180° C., a toluene-insoluble content of 10 to 80%, a quinoline-insoluble content of not more than 1% and fixed carbon of not less than 40%.

8. A process for producing a carbon fiber reinforced carbon composite material, comprising dispersing a short fibrous bundle of carbon fibers composed of a plurality of single fibers which are sizing-free, impregnating with a resin or pitch to form a pre-preg, laminating and molding the pre-preg, baking at a temperature of not more than 2000° C. and then densifying by repeating the impregnating step and baking step at a temperature of not more than 2000° C. to produce a carbon fiber reinforced composite material having a final porosity of not more than 10% by volume.

9. A process for producing a carbon fiber reinforced composite material according to claim 8, wherein the pitch has a softening point of 70° to 120° C., a toluene-insoluble content of 10 to 80%, a quinoline-insoluble content of not more than 1% and fixed carbon of not less than 40%.

10. A sliding material comprising a carbon fiber reinforced carbon composite material produced by the process as defined in claim 1.

11. A sliding material comprising the carbon fiber reinforced carbon composite material as defined in claim 4.

12. A sliding material comprising a carbon fiber reinforced carbon composite material produced by the process as defined in claim 8.

13. A method for controlling production conditions in a process for producing a carbon fiber reinforced carbon composition material which includes the steps of: dispersing a short fibrous bundle of carbon fibers composed of a plurality of single fibers, preparing a sheet in which fibers are in the two-dimensional random orientation, impregnating the sheet with a resin or pitch, laminating and molding the sheet, and then baking and densifying the sheet to form the carbon fiber reinforced carbon composition, said method comprising (a) determining a dispersion index required for obtaining a coefficient of friction, based on formula (1);

$$\text{Dispersion index} = A - B \times \text{coefficient of friction} \quad (1)$$

wherein A and B are constants determined by the steps of:

(i) preparing a plurality of carbon fiber reinforced carbon composites by changing the dispersion conditions while maintaining factors other than the dispersion conditions constant, (ii) measuring the dispersion index and coefficient of friction of each of the carbon fiber reinforced carbon composites prepared in (i), the dispersion index being defined by formula (2) or (3):

$$\text{Dispersion index} = t/W \quad (2)$$

wherein t is entire thickness of the impregnated sheets and W is the weight of the impregnated sheets when the impregnated sheets of an area and a number are placed under a load, $$\text{Dispersion index} = 100 - T \quad (3)$$

wherein T is the transmittance of the impregnated sheets of a weight and an, and thereafter (iii) determining constants A and B from the measured dispersion indexes and coefficients of friction based on the formula (1), and (b) selecting conditions of dispersing the short carbon fibrous bundle and preparing a sheet having the dispersion index calculated in step (a).

* * * * *